United States Patent
Singh Narang et al.

(10) Patent No.: US 11,379,515 B2
(45) Date of Patent: Jul. 5, 2022

(54) MEDIA ATTRIBUTION SYSTEMS AND METHODS

(71) Applicant: Prescient Innovations Inc., Toronto (CA)

(72) Inventors: Sapanpreet Singh Narang, Toronto (CA); Roanie Levy, Toronto (CA); Stephen Sawyer, Toronto (CA)

(73) Assignee: Prescient Innovations Inc., Toronto (CA)

( * ) Notice: Subject to any disclaimer, the term of this patent is extended or adjusted under 35 U.S.C. 154(b) by 337 days.

(21) Appl. No.: 16/503,516

(22) Filed: Jul. 4, 2019

(65) Prior Publication Data

US 2020/0012676 A1 Jan. 9, 2020

Related U.S. Application Data

(60) Provisional application No. 62/695,372, filed on Jul. 9, 2018.

(51) Int. Cl.
| | | |
|---|---|---|
| *G06Q 50/00* | (2012.01) | |
| *G06F 16/45* | (2019.01) | |
| *G06N 20/00* | (2019.01) | |
| *G06F 16/23* | (2019.01) | |
| *G06Q 50/18* | (2012.01) | |

(52) U.S. Cl.
CPC .......... *G06F 16/45* (2019.01); *G06F 16/2308* (2019.01); *G06N 20/00* (2019.01); *G06Q 50/184* (2013.01)

(58) Field of Classification Search
CPC .................................................. G06Q 50/184
See application file for complete search history.

(56) References Cited

U.S. PATENT DOCUMENTS

| | | | | |
|---|---|---|---|---|
| 11,210,372 | B2* | 12/2021 | Savanah | H04L 9/0643 |
| 2016/0203572 | A1* | 7/2016 | McConaghy | G06Q 20/3827 |
| | | | | 705/58 |
| 2016/0300234 | A1* | 10/2016 | Moss-Pultz | G06F 21/10 |
| 2016/0323109 | A1* | 11/2016 | McCoy | G06Q 50/184 |
| 2020/0012765 | A1* | 1/2020 | Smaiely | H04L 9/3239 |
| 2020/0126116 | A1* | 4/2020 | Smith | G06Q 30/0248 |
| 2020/0159890 | A1* | 5/2020 | Chui | G06F 21/128 |
| 2020/0320056 | A1* | 10/2020 | Manningham | G06Q 30/0609 |

(Continued)

FOREIGN PATENT DOCUMENTS

WO  WO-2020134626 A1 * 7/2020 ............ G06F 21/10

OTHER PUBLICATIONS

Materwala, H, A Review of Blockchain Architecture and Consensus Protocols: Use Cases, Challenges, and Solutions, 2019 (Year: 2019).*

(Continued)

*Primary Examiner* — Matthew L Hamilton
(74) *Attorney, Agent, or Firm* — Bereskin & Parr LLP/S.E.N.C.R.L., s.r.l.

(57) ABSTRACT

Systems and methods for providing reliable and authoritative attribution of digital media works at the time of submission to a media distribution service using distributed ledger and machine learning technology. In particular, the described systems and methods facilitate establishing a link between the creator or owner, and their work, in an authoritative and reliable manner.

24 Claims, 8 Drawing Sheets

(56) References Cited

U.S. PATENT DOCUMENTS

2021/0272222 A1* 9/2021 Hatcher .................. G06F 21/10

OTHER PUBLICATIONS

International Search Report and Written Opinion, PCT International Application No. PCT/CA2019/050921, dated Sep. 4, 2019, 8 pages.
Goldenfein et al., "Blockchains, Orphan Works, and the Public Domain", Columbia Journal of Law & the Arts, vol. 41, No. 1, 2017, Dec. 11, 2017, retrieved online on Aug. 28, 2019 from http://microblogging.infodocs.eu/wp-content/uploads/2017/12/41.1_GH.pdf, 43 pages.
Anderson, "The Missing Link Between Blockchain and Copyright: How Companies Are Using New Technology to Misinform Creators and Violate Federal Law", UNC School of Law, North Carolina Journal of Law & Technology, retrieved online on Aug. 28, 2019 from https://scholarship.law.unc.edu/cgi/viewcontent cgi?article=1352&context=ncjolt, 33 pages.
Extended European Search Report, issued in counterpart European Application No. 19833317.1, dated Feb. 10, 2022, 10 pages.
Mazor, Hadar, "Can Blockchain Technology Solve Copyright Attribution Challenges of Digital Work?", dated Feb. 2, 2018, retrieved from <https://www.ipwatchdog.com/2018/02/02/blockchain-technology-solve-copyright-attribution-digital-work/id=93161/>.

* cited by examiner

MEDIA ATTRIBUTION SYSTEMS AND METHODS

CROSS-REFERENCE TO RELATED APPLICATIONS

This application claims the benefit of U.S. Provisional Application No. 62/695,372, filed Jul. 9, 2018, which is incorporated by reference herein in its entirety.

FIELD

The described embodiments relate to systems and methods for digital media attribution.

INTRODUCTION

Most digital media services today rely on the users who submit works to the digital media service to correctly identify the rightful author or owner of the work, with little or no verification. This blind-faith approach can enable piracy and permit monetization of the works by entities other than the rightsholder. "Notice and takedown" approaches have been developed to remove works from public distribution after a dispute claim is registered with the service provider. However, if the author or owner of the work is not correctly identified at the time that the work is submitted to the digital media service—whether due to error, negligence or unauthorized use—it is difficult for end users to trust that the work has been made available with authorization from the rightful owner. This issue may be referred to as the "attribution problem." Rights management organizations today spend considerable time and money manually attributing works as a result of these issues.

SUMMARY

The various embodiments described herein generally relate to scalable computing systems for generating one or more notifications for each of a plurality of accounts, and methods of operating thereof.

In a broad aspect, there is provided a method of attributing media data items in a media attribution system, the method comprising: receiving a media data item, the media data item comprising media data and metadata; computing at least one metric based on the media data item; transmitting an attribution request comprising the at least one metric to a plurality of nodes of the media management system; receiving a plurality of attribution responses from the plurality of nodes, each attribution response comprising a respective attribution score computed by the respective node based on the at least one metric; computing a consensus attribution score based on the plurality of respective attribution scores in the plurality of attribution responses; when the consensus attribution score exceeds a predetermined attribution score threshold, attributing the media data item to one or more rightsholder account in an attribution database.

In some cases, the computing comprises processing the media data item using a machine learning system trained using a corpus of media data items.

In some cases, the machine learning system processes the media data.

In some cases, the machine learning system processes the metadata.

In some cases, the plurality of nodes communicate via peer-to-peer networking.

In some cases, methods may comprise determining, based on the machine learning system processing the media data, that a related media data is stored in the attribution database.

In some cases, methods may comprise updating the attribution database to store a link between the media data and the related media data.

In some cases, methods may comprise invoking an exception handling process.

In some cases, the computing comprises retrieving and comparing the metadata with external metadata sources.

In some cases, each of the plurality of nodes maintains a local copy of the attribution database, further comprising, transmitting the attribution of the media data item to the rightsholder account to each of the plurality of nodes, when the consensus attribution score exceeds the predetermined attribution score threshold.

In some cases, attributing the media data item to the rightsholder account comprises fingerprinting the media data to generate a unique identifier associated with the media data, and storing the unique identifier in the attribution database.

In some cases, attributing the media data item to the one or more rightsholder account comprises determining one or more related media data items in the attribution database, and storing a link between the media data item and the one or more related media data items in the attribution database.

In some cases, attributing the media data item to the one or more rightsholder account comprises determining a timestamp, and storing the timestamp in the attribution database.

In some cases, methods may comprise generating one or more automated processes, each of the automated processes generating an output associated with the one or more rightsholder account.

In some cases, the media management system comprises a blockchain, and wherein the one or more automated processes are smart contracts.

In some cases, the one or more automated processes comprise a smart contract selected from the group consisting of: a right owner smart contract, a royalty smart contract, and a disputes smart contract.

In some cases, methods may comprise, when the consensus attribution score does not exceed the predetermined attribution score threshold, transmitting a non-attribution notification to the plurality of nodes.

In some cases, methods may comprise engaging an exception handling process in response to the non-attribution notification.

In some cases, the exception handling process is a computational consensus mechanism involving the plurality of nodes.

In another broad aspect, there is provided a non-transitory computer readable medium storing computer-executable instructions that, when executed by a computer processor, cause the computer processor to perform the methods as described herein.

DRAWINGS

Embodiments of the present invention will now be described in detail with reference to the drawings, in which.

Figure 1:
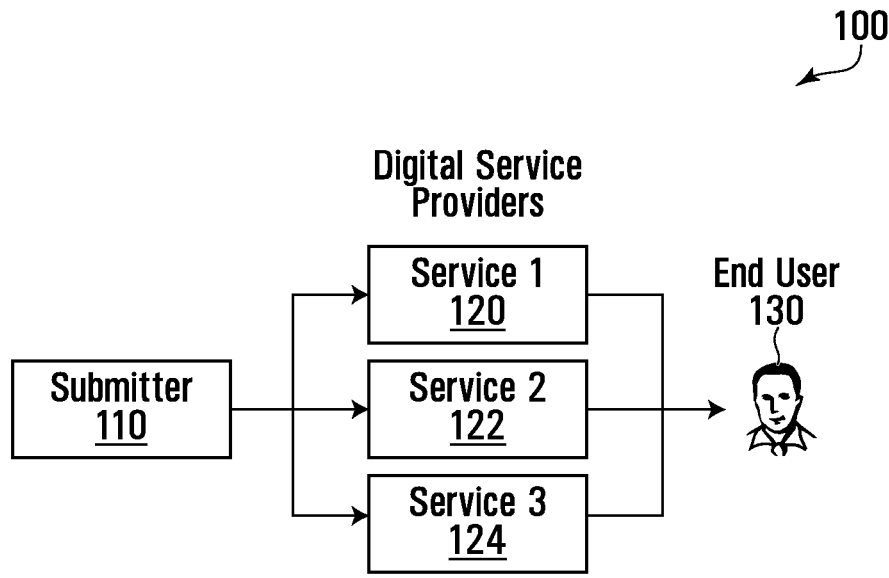
FIG. 1 illustrates a digital media workflow in accordance with the prior art.

The drawings are provided for purposes of illustration, and not of limitation, of the aspects and features of various examples of embodiments described herein.

DESCRIPTION OF VARIOUS EMBODIMENTS

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details, or with other methods, components, materials, etc. In other instances, well-known methods, procedures and components have not been described in detail have not been shown or described in detail to avoid unnecessarily obscuring descriptions of the embodiments, and since these are known to those skilled in the art. Furthermore, it should be noted that this description is not intended to limit the scope of the embodiments described herein, but rather as merely describing one or more exemplary implementations.

Unless the context requires otherwise, throughout the specification and claims which follow, the word "comprise" and variations thereof, such as, "comprises" and "comprising" are to be construed in an open, inclusive sense, that is as "including, but not limited to."

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and abstract of the disclosure provided herein are for convenience only and do not interpret the scope or meaning of the embodiments.

The terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

Similarly, throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), optical pathways (e.g., optical fiber), electromagnetically radiative pathways (e.g., radio waves), or any combination thereof. Exemplary communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, a wireless radio, or the like) depending on the nature of the device.

It should also be noted that there may be some elements that are used to implement at least part of one of the embodiments described herein that may be implemented via software that is written in a high-level computer programming language such as one that employs an object-oriented paradigm. Accordingly, the program code may be written in Java, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, EEPROM, magnetic disk, optical disc) or a device that is readable by a general or special purpose programmable device. The software program code, when read by the programmable device, configures the programmable device to operate in a new, specific and predefined manner in order to perform at least one of the methods described herein.

The description sets forth various embodiments of the systems, devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory computer-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

Digital media services that fail to use reliable attribution mechanisms risk amplifying existing challenges encountered on the Internet, such as piracy and monetization of content by parties other than the rightful owner.

Referring now to FIG. 1, there is illustrated a digital media workflow in accordance with the prior art. Workflow 100 begins with a submitter of a digital media work submitting the digital media work to one or more digital services 120, 122 and 124. The digital services may have media ingestion processes such as, e.g., web forms, file upload sites, etc. As part of the media ingestion process, the digital service may request or require the submitter to attest that the submitter has the right to upload the digital media work to the digital service and to authorize the digital service to distribute the digital media work to end users 130. However, the digital services may not perform further verification of the attestation or may rely upon after-the-fact notification of erroneous attribution such as using notice and takedown schemes.

In contrast, the described systems and methods generally relate to providing reliable and authoritative attribution of digital media works (referred to herein as media data items) at the time of submission using distributed ledger and machine learning technology. In particular, the described systems and methods facilitate establishing a link between the creator or owner, and their work, in an authoritative and reliable manner.

The described systems and methods can interoperate with existing data models and sources of industry data. In particular, the described systems and methods provide an attribution layer or protocol that may be used to attribute media data items prior to ingestion into digital media services. As part of the attribution protocol, machine learning can be used to identify similar or identical media data items. For example, the machine learning may involve a text recognition module, an image recognition module, an audio recognition module and a video recognition module. Each respective module may, in some cases, generate a "fingerprint" based on input data and compare this to known fingerprints. Cryptographic functions and computational consensus mechanisms can be used to achieve agreement on proposed attributions of media data items, thereby reducing the impact of incorrect attribution by the submitter and removing reliance on a single party to determine attribution.

Rather than relying on a binary attribution mechanism, media data items can be scored according to an algorithm, with the score reflecting a degree of confidence in the attribution. In cases where the attribution is contested, exception handling mechanisms are provided to enable parties to reliably, and even automatically, resolve attribution.

Exception handling may involve multiple processes. For example, in cases where a dispute between participants is identified, and based on the nature of the dispute (e.g., copyright infringement), the creative work may be withheld from distribution to end users on digital services that use the attribution ledger system. In some cases, the dispute can be contested and/or resolved using the attribution ledger system with automated dispute resolution mechanisms, and those mechanisms can resolve the dispute thereby allowing distribution on the digital services. In some other cases, the dispute may be contested and/or resolved outside the attribution ledger system, in which case the attribution ledger system may, or may not, play a role in resolving the dispute. An example of an exception handling process is provided with respect to FIG. 10.

In some cases, indemnity funds can be used to compensate owners, creators or service providers in the event of errors.

The term "attribution" as used herein refers to the ability to connect a digital media work to its creator or owner, or both (the "rightsholders") in a reliable and authoritative manner.

Based on the content type of a media work, or a combination of content types, various specific elements of attribution protocol can be carried out. Media data items may have a variety of content types, such as, e.g., text, visual art, video, audio, etc. Media data items processed using the attribution protocol can be further ingested into digital media services.

As noted above, the described systems and methods implement an attribution protocol to establish a definitive link between the rightsholders and the media data items based on a consensus mechanism. The attribution protocol includes three primary components: a master attribution ledger, an administrative structure and an exception handling process.

A master attribution ledger may be a distributed ledger, or blockchain, that provides storage of unique digital fingerprints all media data items, metadata related to the media data items, and in some cases links to external data sources where the media data items themselves are stored (e.g., media files such as audio or video files). In some cases, the master attribution ledger may simply contain a unique identifier or link, or both, that can be used to retrieve fingerprints, media and metadata from external data sources. The unique digital fingerprints may be generated each time new media data is submitted for inclusion in the master attribution ledger, and may be searched to determine whether certain media data items already exist in the master attribution ledger. In some cases, machine learning algorithms may be used to identify similar media data items, based on image or content/text scanning fingerprinting techniques, or metadata similarity. The master attribution ledger may employ computation consensus mechanisms to ensure reliable attribution.

The master attribution ledger may be a permissioned distributed ledger (e.g., private) or a public distributed ledger. Generally, both types of ledgers may provide for auditing, monitoring and usage statistics, while preserving participant privacy and confidentiality. In a distributed ledger system, the data and parameters of updates to the ledger ("transactions") can be preserved into a hash chain structure. A hash chain provides an audit trail, typically immutable, where transactions that are received within the same time period can be organized into blocks, and each block contains evidence of the previous block's contents (typically as hashes). In this way, an investigator can iterate backwards from a starting block to a block containing a transaction of interest and have confidence that these blocks have not been modified.

To gain confidence that the starting block is valid, an investigator can observe the latest block computed by other participants (for the latest transactions). As there is consensus on the latest block (and therefore also the evidence of the previous block), an investigator can have confidence that the starting block has not been tampered with. The investigator can then proceed through each block until they find their transaction. An investigator also has confidence in each recorded transaction within a valid block since multiple participants independently endorse each transaction.

In embodiments with a permissioned ledger, any authorized entities, external data sources, rightsholders or service providers can validate attribution of media data items through a consensus mechanism.

In embodiments with a public ledger, generally only the rightsholders and service providers can validate the attribution of a creative work through consensus mechanisms and incentives. In addition, the administrative structure for the master attribution ledger will oversee onboarding and offboarding of ecosystem players, trigger various dispute resolution mechanisms including indemnity provisions in case of issues with attribution.

An administrative structure may be provided to allow on-boarding of participants (e.g., rightsholders, users and service providers), and to define and manage roles and the privileges associated with each role. Participant privileges as part of the exception handling process can also be defined in the administrative structure.

An exception handling process may be provided to resolve attribution errors, in cases where attribution scores are too low, or for use upon request by one or more parties. The exception handling process may involve a computational appeal system, in which an attribution score may be challenged and a second consensus mechanism approach may be engaged, as described herein. In some cases, the exception handling process may involve external dispute resolution mechanisms, such as legal or other processes. Based on the outcome of the exception handling process, a new attribution score can be computed and registered in the master attribution ledger and/or communicated to the system participants. An example of an exception handling process is provided with respect to FIG. 10.

In some cases, a resolution fund, or "indemnity fund" can be provided by levying a fraction of transaction fees associated with operation of the system to compensate rightsholders in the case of incorrect attribution prior to execution of the exception handling process. In some cases, third party insurers may also provide insurance to be used to compensate parties and, in such cases, insurers may refer to the master attribution ledger to determine the provenance of certain media data items.

Security, privacy, encryption and role-based access control can be instituted to provide for decentralization, anonymized identities and the safeguard of business-specific information.

Figure 2:
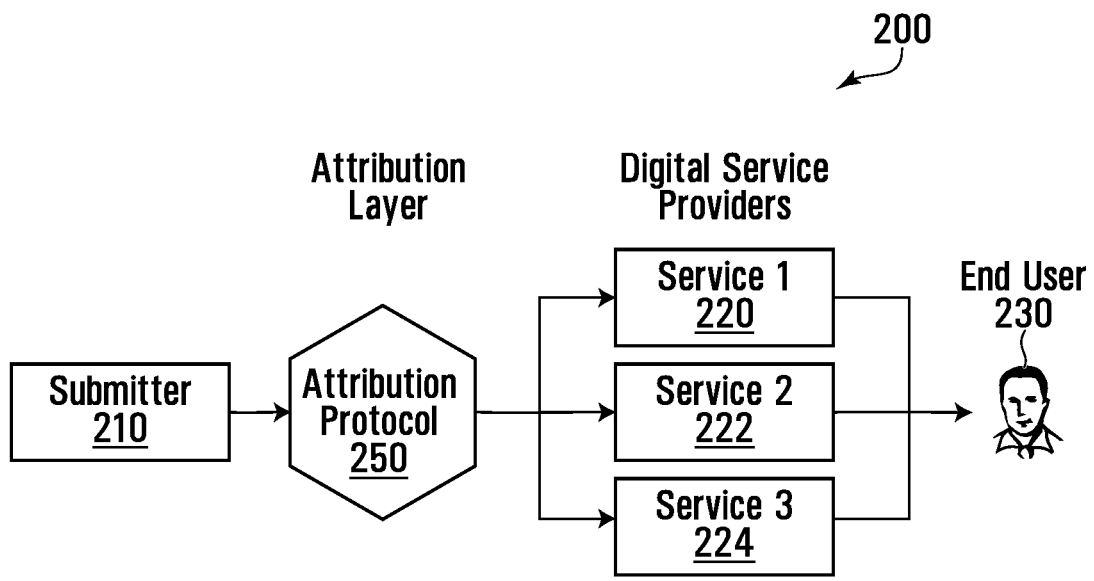
FIG. 2 illustrates a simplified digital media workflow in accordance with at least some embodiments.

Referring now to FIG. 2, there is illustrated a simplified digital media workflow in accordance with at least some embodiments. Workflow 200 may be performed by, for example, elements of system 600 of FIG. 6 as described herein. Workflow 200 begins with a submitter of a digital media work submitting the digital media work to an attestation server 250, as described further herein. The attestation server 250 may carry out the attestation protocol described herein and, upon the completion of scoring, the digital media work may be submitted further to one or more digital services 220, 222 and 224. In some embodiments, the submitter may submit the attested digital media work, along with a cryptographic proof of attestation, to the digital services using a media ingestion process such as, e.g., web forms, file upload sites, etc. In other embodiments, the attestation server 250 may submit the work using a digital service application programming interface (API). The digital services may then distribute the digital media work to end users 230. In this way, the digital services may distribute only those media data items that have received an attribution score using the attribution protocol. In some cases, only those media data items that have received an attribution score above a predefined threshold may be distributed. Media data items that receive an attribution score below the predefined threshold may be withheld from distribution pending completion of the exception handling process.

Figure 3:
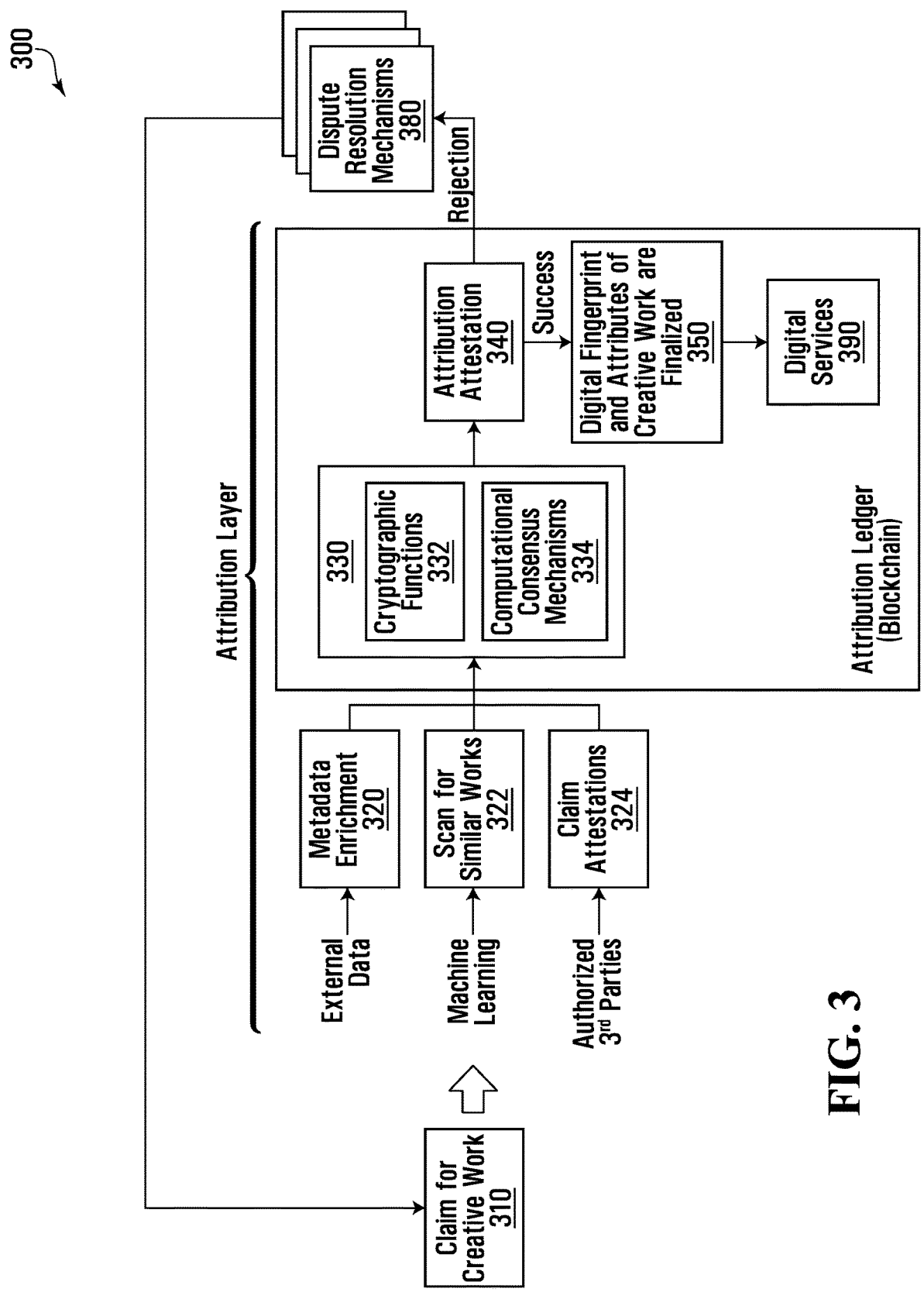
FIG. 3 illustrates a digital media workflow in accordance with at least some embodiments.

Referring now to FIG. 3, there is illustrated a digital media workflow in accordance with at least some embodiments. Workflow 300 may be performed by, for example, elements of system 600 of FIG. 6 as described herein.

Workflow 300 begins with a submitter of a digital media work submitting the digital media work to an attestation server at 310.

In some cases, the attestation server may determine whether metadata for the digital media work is missing or requires augmentation and, if so, perform metadata enrichment at 320. Metadata enrichment can be performed by using known metadata to make queries to external data providers. For example, an International Standard Book Number (ISBN) or International Standard Name Identifier (ISNI) number associated with the detail media work can be submitted to APIs and/or web services to retrieve data from these sources and validate the information against the information provided by the submitter.

At 322, the attestation server may perform a machine learning analysis of the digital media work and its associated metadata. The machine learning analysis may compare its analysis with pre-existing data in the master attribution ledger, or in external data sources (e.g., via the Internet), or both. If the same or similar media data items are found, the attestation server may execute one or more review process to attempt to de-conflict the submitted digital media work and the comparison digital media work.

In a first stage of the review process, the attestation server may trigger an automated process (e.g., smart contract) in the master attribution ledger for each similar work. The automated process may verify the claims made in the submitted digital media work to determine whether there is any conflict with the claims of the existing digital media work already in the ledger.

For example, if the submitted digital media work is an e-book and the comparison digital media work, which is already in the attribution ledger, is a photograph, then the automated process for the photograph may be executed to verify that the use of the photograph in the e-book is authorized and/or is not prohibited. To facilitate such reviews, the submission process to the attestation server may request authorization information, e.g., in the form of cryptographically signed authorizations, or the authorizations may be requested upon detection of a conflict. The cryptographically signed authorizations may subsequently form part of the metadata for the digital media work for use in the consensus forming process.

In a second stage of the review process, a link may be created between the submitted work and the comparison work (e.g., parent-child relationship). For example, both ePub and Kindle™ formatted versions of an e-book may be linked to a master version of the e-book. The master version of the e-book itself may contain photographs at various resolutions (e.g., 72 ppi and 300 ppi), which each may be linked to their respective master photographs.

A third stage of the review process may be invoked if the submitter of the submitted work believes that their rights to the submitted work supersede or replace those of the comparison work. In such cases, the exception handling process may be invoked, for example as shown with respect to FIG. 10.

In some cases, submissions from authorized third parties may be processed at 324. Expert and authorized third parties such as, e.g., museum, publishers, record labels, etc. may provide certified attestations that can be provided with a submission or upon request as part of the review process. For example, a publishing house may provide an attestation in support of a visual artist's claim to have designed a book cover printed by the publishing house.

At 330, the submitted work may be transmitted to all nodes of the network that maintains the master attribution ledger (and in some cases external devices) in order to compute a plurality of metrics as part of the cryptographic functions 332 and computational consensus mechanism 334. In some cases, data from external data sources (e.g., to substantiate attestations from authorized third parties) and the results from automated scans using machine learning algorithms may be used as inputs to the consensus mechanism.

Each node may compute and/or verify the metrics and generate an attribution score based on the metrics and input data at 340. The attribution score can be used to indicate a confidence level in the attribution claim (i.e., the confidence level in linking the rightsholder to the submitted work). Generally, a higher attribution score corresponds to a higher degree of confidence, however other scoring mechanisms can also be used (e.g., lower score indicates higher confidence). In some embodiments with a permissioned blockchain, the consensus mechanism may allow all authorized entities, external data sources and community members to validate the attribution claims. In some embodiments with a public blockchain, generally only the nodes of the blockchain can validate the attribution.

When the attribution score exceeds a predefined threshold, the workflow may proceed to 350 for finalizing the submitted attribution claim for the creative work. Finalizing the submitted work may involve: a) generating and/or updating a unique identifier for the fingerprint of the submitted work; b) linking to related media data items; c) generating and/or updating timestamps of claims by rightsholders to the submitted work; d) generating and/or updating trust badges based on an attribution score; e) updating permissions and/or role-based access control for the submitted work; f) encrypting metadata and attributes associated with the work; and g) generating one or more automated process (e.g., smart contracts) associated with the submitted work.

Automated processes associated with a work may include a rightsholder smart contract, a royalty smart contract, an exceptions smart contract and other smart contracts.

A rightsholder smart contract may be configured to manage the rights associated with claims submitted by an author or owner. For example, the rightsholder smart contract for a given book may handle publisher claims to the print and digital editions of the book and may also handle claims for film production rights based on the book by film studios.

Claims may include information such as the authors or publishers of a work. The rightsholder smart contract may identify payments to be made upon the purchase or transfer of the underlying work (e.g., a book), and may also specify properties of the work itself, such as the number of authorized copies. The rightsholder smart contract may provide methods for creating the smart contract, querying or adding authorized copies, transferring to new rightsholders, querying for rightsholders or payment rates, purchasing or transferring the underlying works by and between authorized users, and querying for authorized users of works. It may further call upon or use methods of other smart contracts (e.g., royalty smart contracts) to perform further processing.

One example of a rightsholder smart contract for a book is provided below, written in the Solidity programming language. First, there is provided example source code for implementing a "book" work (e.g., Book.sol):

```
pragma solidity ^0.4.24;
contract Book {
    struct RightOwnerInfo {
        uint Id;
        uint rate;
        bool admin;
    }
    uint public bookPriceInWei;
    uint public copiesAvailable;
    uint public totalCopies;
```

```
        uint public rightOwnerCount;
        uint private MAX_RATE = 100;
        address[ ] public rightOwnersAddresses;
        mapping(address => RightOwnerInfo) public rightOwners;
        mapping(address => uint) public copies;
        event RightOwnerAdded(address indexed _rightOwner, uint
indexed _id, uint _rate, uint _timestamp);
        event RightOwnerPayment(address indexed _rightOwner, uint
indexed _id, uint indexed _amount, uint _timestamp);
        event BookPurchase(address indexed _buyer, uint
_priceInWei, uint _timestamp);
        event BookTransfer(address indexed _to, uint indexed
_copy, uint _timestamp);
        event CopiesAdded(uint indexed _additionalCopies, uint
indexed _totalCopiesAvailable, uint _timestamp);
        event RightOwnerRateUpdated(address indexed _by, address
indexed _rightOwner, uint indexed _newRate, uint _timestamp);
        constructor(address _owner, uint priceInWei, uint _copies)
public {
                copiesAvailable = _copies;
                totalCopies = _copies;
                bookPriceInWei = priceInWei;
                rightOwners[_owner].Id = 1;
                rightOwners[_owner].rate = MAX_RATE;
                rightOwners[_owner].admin = true;
                rightOwnerCount = 1;
                rightOwnersAddresses.push(_owner);
        }
        function addCopies(uint _additionalCopies) public {
                require(rightOwners[msg.sender].admin == true);
                copiesAvailable += _additionalCopies;
                totalCopies += _additionalCopies;
                emit CopiesAdded(_additionalCopies, totalCopies, now);
        }
        function newRightOwner(address _rightOwner, uint _rate,
bool _admin) public returns (bool) {
                require(rightOwners[msg.sender].admin == true);
                require(rightOwners[msg.sender].rate > _rate);
                rightOwnerCount++;
                rightOwners[_rightOwner].Id = rightOwnerCount;
                rightOwners[msg.sender].rate -= _rate;
                rightOwners[_rightOwner].rate = _rate;
                rightOwners[_rightOwner].admin = _admin;
                rightOwnersAddresses.push(_rightOwner);
                emit RightOwnerAdded(_rightOwner, rightOwnerCount,
_rate, now);
                return true;
        }
        function updateRightOwnerRate(address _to, address _from,
uint _rate) public returns (bool) {
                require(rightOwners[msg.sender].admin == true);
                require(rightOwners[_from].Id != 0);
                require(rightOwners[_to].Id != 0);
                rightOwners[_from].rate -= _rate;
                rightOwners[_to].rate += _rate;
                emit RightOwnerRateUpdated(msg.sender, _to,
rightOwners[_to].rate, now);
                return true;
        }
        function addressOwnsBook( ) public view returns (bool) {
                return copies[msg.sender] > 0;
        }
        function buyBook( ) payable public returns (bool) {
                require(copiesAvailable >= 1);
                require(msg.value == bookPriceInWei);
                copies[msg.sender]++;
                for (uint i = 0; i < rightOwnersAddresses.length; i++){
                        address rightOwnerAddr = rightOwnersAddresses[i];
                        uint rightOwnerRate =
rightOwners[rightOwnerAddr].rate;
                        uint amountToSend =
msg.value*rightOwnerRate/MAX_RATE;
                        rightOwnerAddr.transfer(amountToSend);
                        emit RightOwnerPayment(rightOwnerAddr,
rightOwners[rightOwnerAddr].Id, amountToSend, now);
                }
                copiesAvailable--;
                emit BookPurchase(msg.sender, bookPriceInWei, now);
                return true;
```
```
        }
        function transferBook(address _to, uint _copy) public
returns (bool) {
                require(copies[msg.sender] > 0);
                copies[msg.sender]--;
                copies[_to]++;
                emit BookTransfer(_to, _copy, now);
                return true;
        }
}
```

Second, there is provided example source code for creating a specific instance of a "book" work:

```
pragma solidity ^0.4.24;
import "./Book.sol";
contract AttributionLedger {
        struct ContractInfo{
                address contractOwner;
                address bookAddress;
                uint timestamp;
        }
        uint private idNum = 0;
        mapping (uint => ContractInfo) private bookInstances;
        event NewBook(address indexed _owner, address indexed
_addr, uint _timestamp);
        function newBook(uint _priceInWei, uint _copies) public
returns (bool) {
                idNum++;
                address owner = msg.sender;
                Book b = new Book(owner, _priceInWei, _copies);
                bookInstances[idNum].contractOwner = owner;
                bookInstances[idNum].bookAddress = b;
                bookInstances[idNum].timestamp = now;
                emit NewBook(owner, b, now);
                return true;
        }
        function getContractInfo(uint _id) public view returns
(address contractOwner, address bookAddress, uint timestamp) {
                return (bookInstances[_id].contractOwner,
bookInstances[_id].bookAddress, bookInstances[_id].timestamp);
        }
        function getBookAddress(uint _id) public view returns
(address) {
                require(_id > 0 && _id <= idNum);
                return bookInstances[_id].bookAddress;
        }
        function getBookCount( ) public view returns (uint) {
                return idNum;
        }
}
```

A royalty smart contract may be configured to manage fund allocation determinations associated with royalty payments for a work generated by an end user transaction. For example, the smart contract may determine that, upon the sale of a book, the publisher receives 40% of the revenue and the author receives 25% of the revenue.

An exceptions smart contract may be configured to manage the exception handling process associated with a work, or a claim to a work. For example, if a person, "Jane Doe," submits a claim to a given book and the attribution score fails to meet the predefined threshold, the exceptions smart contract may be triggered to execute based on the exception handling process described elsewhere herein.

Other smart contracts may be configured based on the nature of the work. For example, there may be action smart contracts triggered by some action or by some event (e.g., resale rights for visual art media data items).

Once the submitted attribution claim is accepted, the workflow may proceed to distribution or use by digital services at 390.

Figure 10:
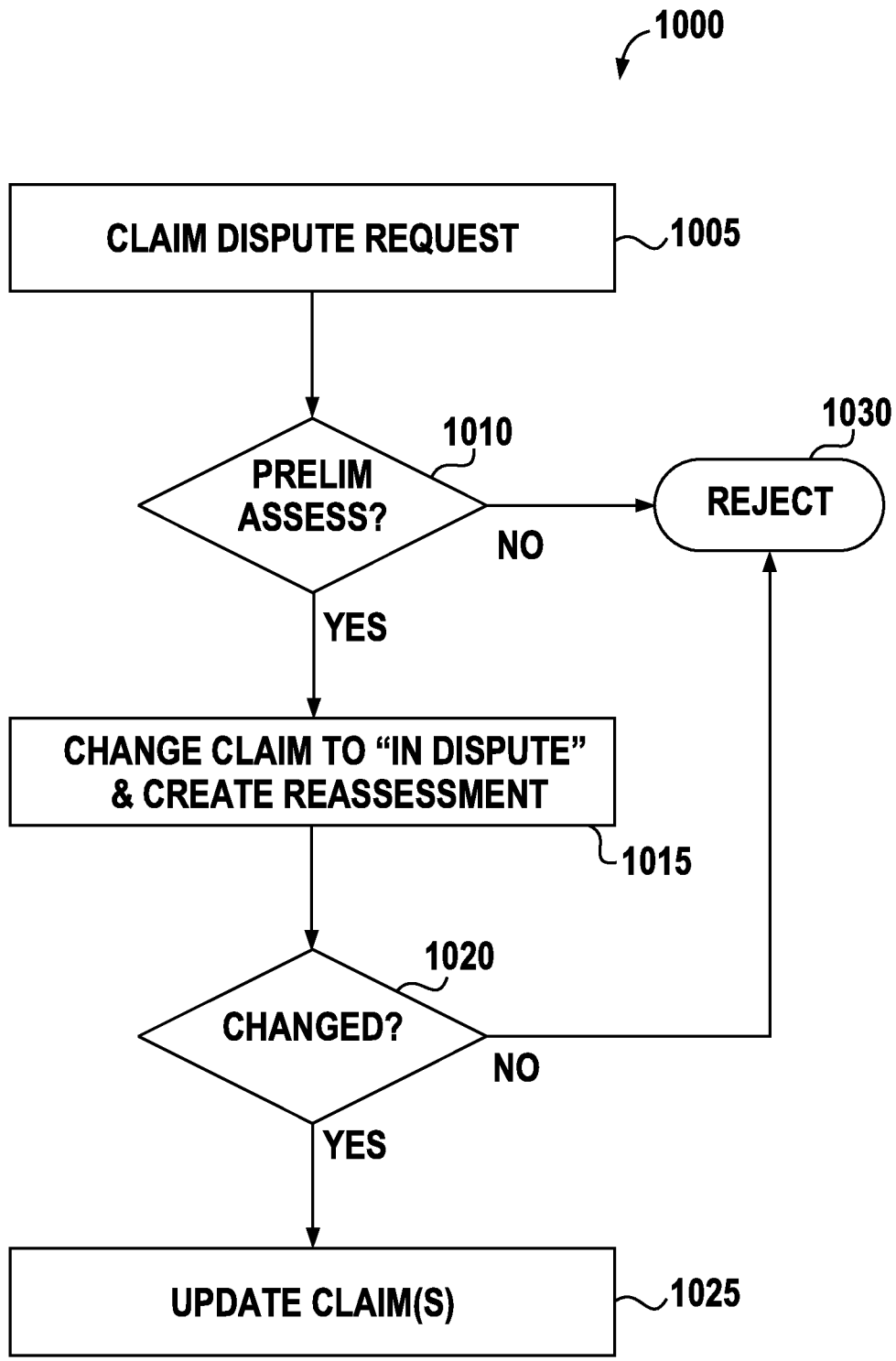
FIG. 10 is an example process flow diagram for a method of dispute resolution in a media attribution ledger system in accordance with at least some embodiments.

When the attribution score fails to exceed the predefined threshold, the workflow may proceed to 380 for the start of the exception handling process, which may occur as described, for example, with reference to FIG. 10.

Figure 4:
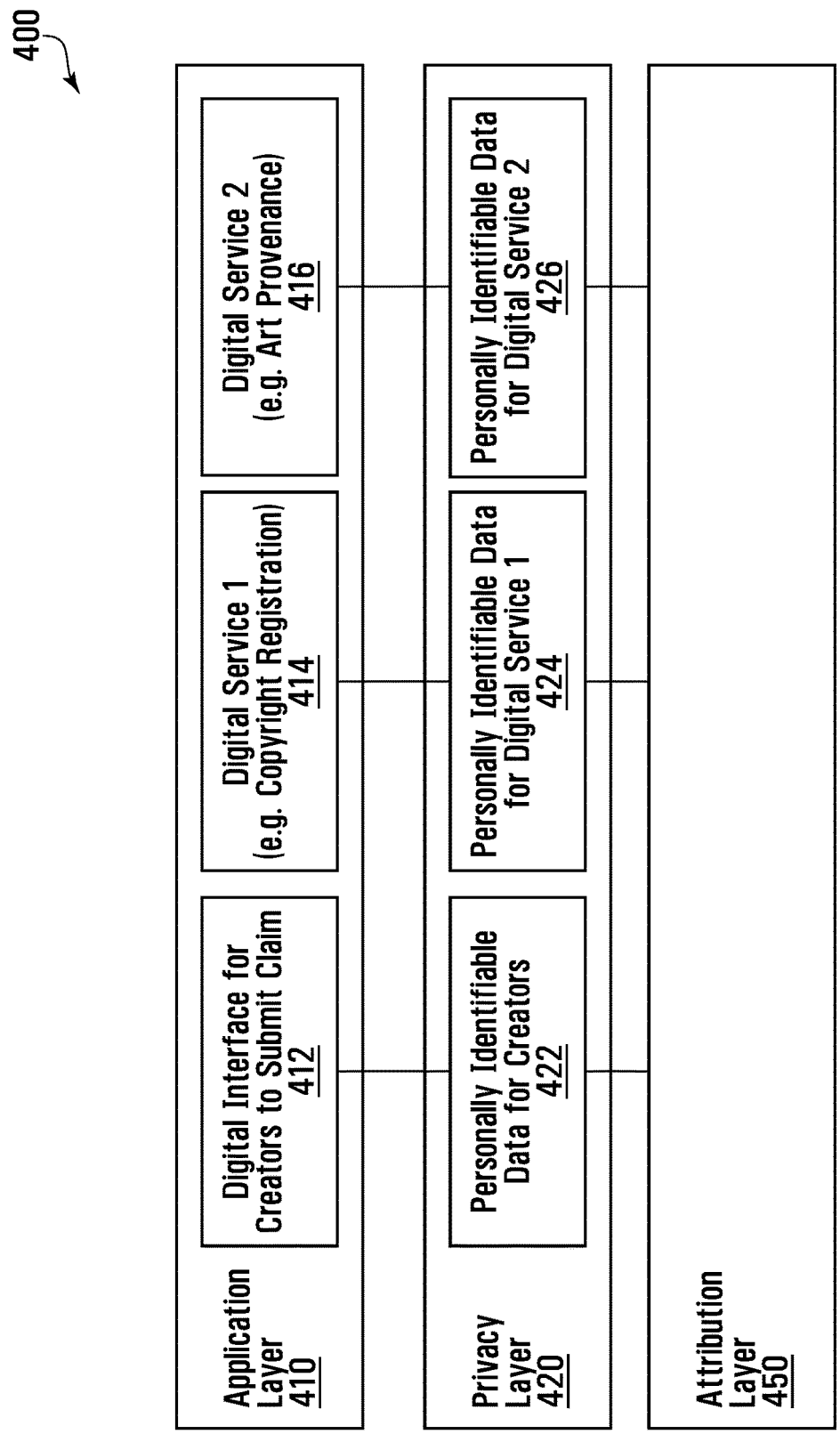
FIG. 4 illustrates an example system architecture for a media attribution ledger system in accordance with at least some embodiments.

Referring now to FIG. 4, there is illustrated an example system architecture for an attribution ledger system in accordance with at least some embodiments. System architecture 400 may be performed by, for example, elements of system 600 of FIG. 6 as described herein.

System architecture 400 is generally divided into three layers: an application layer 410, a privacy layer 420 and an attribution ledger layer 450.

Figure 6:
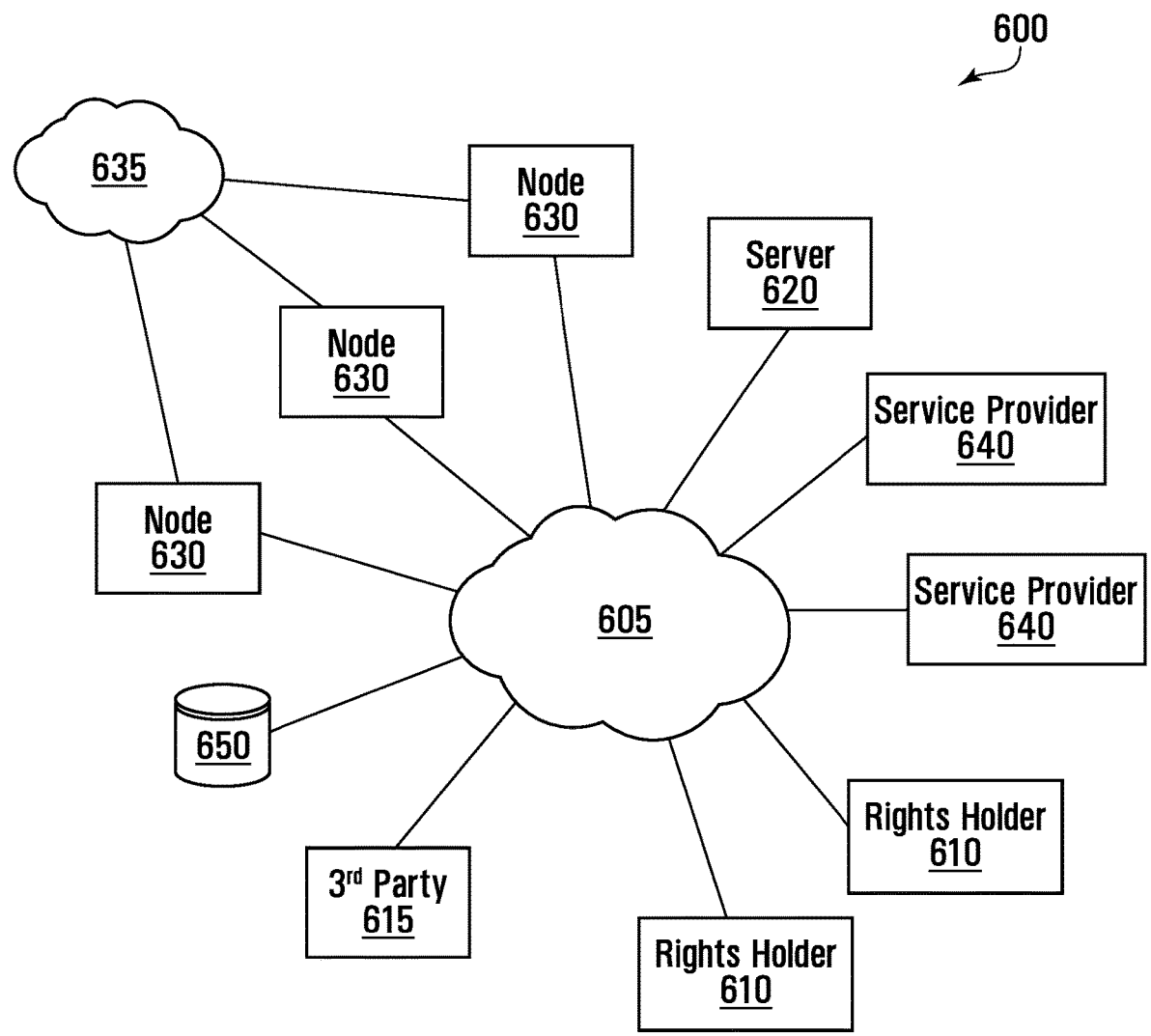
FIG. 6 is a schematic block diagram of a media attribution system in accordance with at least some embodiments.

The functions of application layer 410 may be performed, for example, by computing devices such as user device 610 and service provider server 640 of FIG. 6. For instance, a user device may execute an application program 412 that provides a digital interface for submitting media data items or claims to media data items. Another user device may execute an application program (not shown) that provides a digital interface for end users to retrieve media data items and view them. Still another user device may execute an application program that can be used for administrative tasks related to the system. Each of the application programs may be developed in a respective programming language and framework, and may have access to local and remote databases, in addition to the attribution ledger.

Similarly, a service provider device may execute a service program that handles requests for copyright registration, as in service 414, or requests related to art provenance, as in service 416.

In some cases, the application program or service program may be a compiled application program stored locally. In other cases, the application program may be a web-based application provided by a server, such as server 620, service provider server 640 or node 630 of FIG. 6.

Each application may interact with the privacy layer 420 by invoking a service to strip personally-identifying information and insert anonymized information into the metadata associated with media data items. For example, application program 412 may invoke a privacy service 422, executed by a server computer, to strip personal information of the rightsholder submitting the claim and insert an anonymized identifier. The connection between the personal information and the anonymized identifier may be stored in an off-ledger storage, such as external storage 650 of FIG. 6. Similar processes can be performed using services 424 and 426 for services 414 and 416, respectively. In some cases, the privacy layer 420 may also store related cryptographic keys in the external storage.

Figure 9:
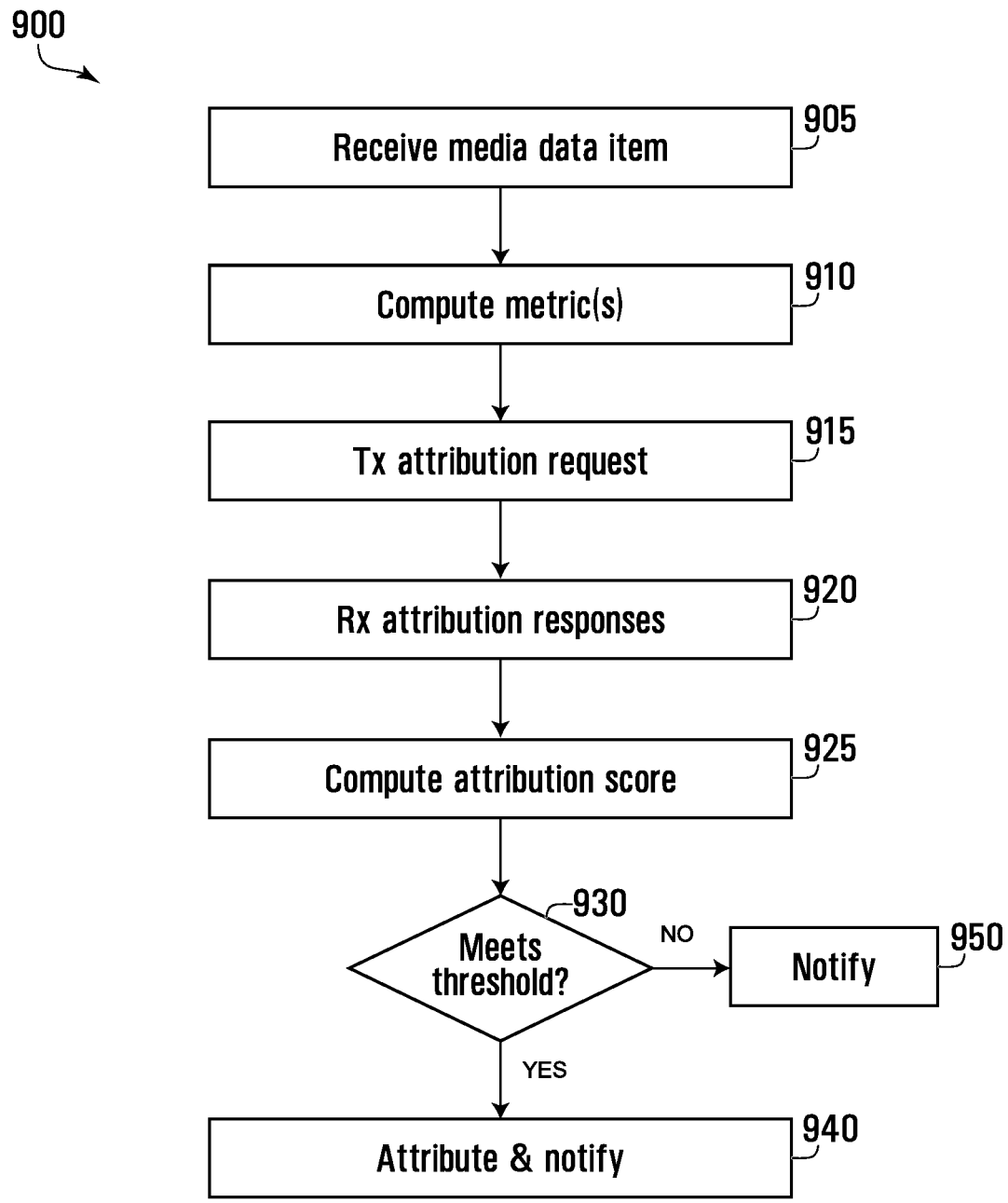
FIG. 9 is an example process flow diagram for a method of attributing media data items in an attribution ledger system in accordance with at least some embodiments.

The attribution layer 450 may be performed by, e.g., the nodes and servers of FIG. 6 to carry out the functions described elsewhere herein, for example with reference to FIGS. 2, 3 and 9.

Figure 5:
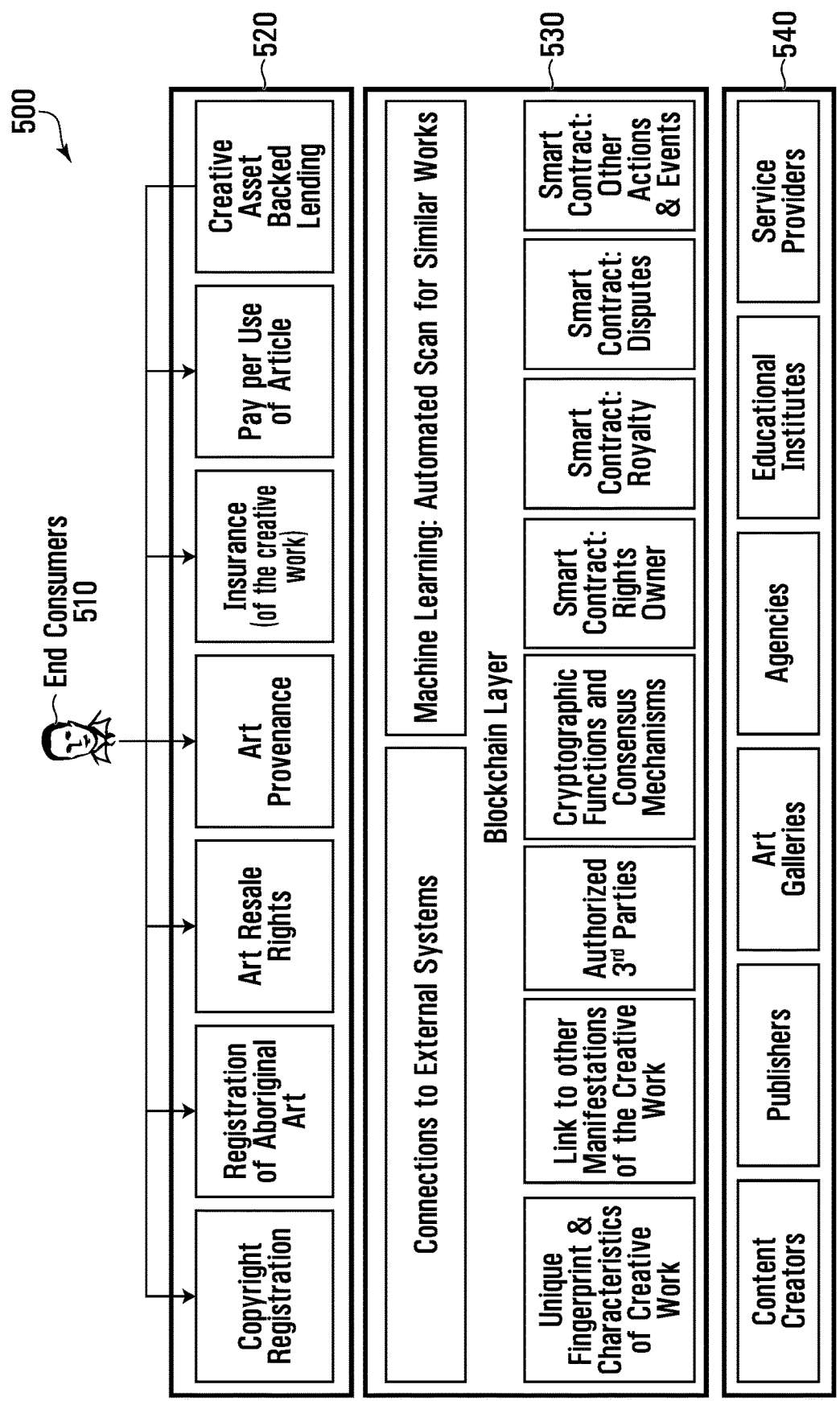
FIG. 5 illustrates an example service architecture for a media attribution ledger system in accordance with at least some embodiments.

Referring now to FIG. 5, there is illustrated an example service architecture for an attribution ledger system in accordance with at least some embodiments. Service architecture 500 may be performed by, for example, elements of system 600 of FIG. 6 as described herein.

Service architecture 500 generally illustrates the interconnections between the parties that may use the attribution ledger system. Accordingly, service architecture 500 is generally divided into four layers: an end user layer 510 for consumers and other end users, a digital services layer 520, an attribution ledger layer 530 and a participants layer 540.

End user layer 510 illustrates the consumers and other end users who may interact with various media-related services, illustrated as digital services layer 520.

Digital services may include, but are not limited to, copyright registration, registration of aboriginal art, art resale registration, art provenance services, insurance services, pay-per-use services and creative work asset-backed lending.

These digital services may be connected to the attribution layer 530 via various APIs and other connections. The attribution layer 530 can, in turn, connect to various participants of participant layer 540.

Participant layer 540 includes, but is not limited to, various stakeholders in the attribution system, such as content creators, publishers, art galleries, agencies, educational institutions and service providers.

The functions of application layer 410 may be performed, for example, by computing devices such as user device 610 and service provider device 640 of FIG. 6. For instance, a user device may execute an application program 412 that provides a digital interface for submitting media data items or claims to media data items. Another user device may execute an application program (not shown) that provides a digital interface for end users to retrieve media data items and view them. Still another user device may execute an application program that can be used for administrative tasks related to the system. Each of the application programs may be developed in a respective programming language and framework, and may have access to local and remote databases, in addition to the attribution ledger.

Referring now to FIG. 6, there is illustrated a schematic block diagram of an attribution system in accordance with at least some embodiments. In the illustrated example, attribution system 600 has a plurality of user devices 610, a plurality of service provider devices 640, at least one application server 620, at least one third party device 615, an external storage device 650 and a plurality of nodes 630. In some embodiments, one or more of the service provider devices 640, user devices 610 or application servers 620 may also function as nodes 630. Each of the plurality of user devices 610, plurality of service provider devices 640, at least one application server 620, at least one third party device 615, external storage device 650 and plurality of nodes 630 are connected to a network 605, such as the Internet. In addition, each of nodes 630 are interconnected by a network 635, which provides the peer-to-peer network for the master attribution ledger system. In some embodiments, network 635 may be physically distinct private network, while in other embodiments network 635 may be a virtual private network, in which case the underlying communications link may be via network 605.

Network 605 may be a public network, such as the Internet, a private network, or some combination thereof. In some cases, network 160 may be a direct communications link. The data communication network can be constructed using various networking technologies and topologies. For example, portions of the network may be mobile data networks. Although not explicitly described in each case, communications between the various elements of system 600 generally involve session-level security, such as Transport Layer Security (TLS).

User devices 610 may be computing devices used by rightsholders to access the attribution ledger system. As a computing device, user device 610 generally has a processor, memory and input/output devices to transmit and receive data, and to process data, as desired. Similarly, service provider devices 640 may be computing devices used by service providers to access the attribution ledger system.

Application server 620 is a computing device that provides a service, such as, e.g., responding to requests for metadata regarding ISBN or ISNI numbers.

External storage device 650 is a computing device such as a storage server, which provides access to remote hosts for data storage and retrieval via network 650.

Nodes 630 are computing devices that act as attribution ledger distributed nodes. For example, each node 630 may execute software to carry out peer-to-peer networking, compute metrics, and generally perform the actions associated with the attribution ledger consensus mechanism. Although illustrated as distinct devices, other devices may act as nodes, as mentioned.

Figure 7:
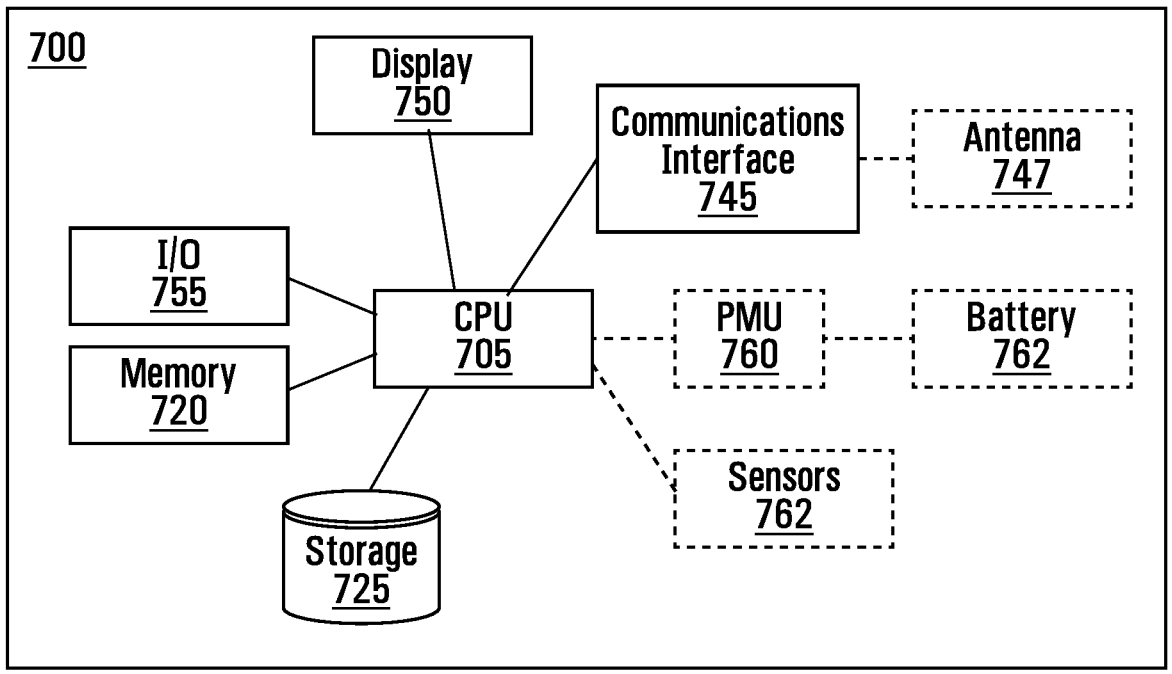
FIG. 7 is a simplified block diagram of a user device in accordance with some embodiments.

Referring now to FIG. 7, there is illustrated a simplified block diagram of user device 700. User device 700 is one example implementation of the user devices 610 of FIG. 6.

User device 700 has a processor 705, which is communicatively coupled to a volatile memory 720, a non-volatile memory 725, one or more input devices 755, one or more output devices 750, one or more sensors 770, and a data communications interface 745. In some cases, an antenna 747 may be provided that is coupled to data communications interface 745. In some cases, user device 700 may have a power management unit (PMU) 760 and a battery 762.

In at least some embodiments, user device 700 is a mobile computing device, such as a smart phone or tablet device. In some embodiments, user device 700 may be a non-portable computing device, such as a personal computer, a computer server, or the like.

In some embodiments, user device 700 may have a peripheral bus interface (not shown) which is used to communicatively couple the processor 705 with other elements of user device 700. It will be appreciated that FIG. 7 is a simplified diagram of but one example embodiment, and that various other arrangements and computer system architectures may be used.

Processor 705 is a computer processor, such as a general purpose microprocessor or microcontroller. In some other cases, processor 705 may be a field programmable gate array, application specific integrated circuit, microcontroller, or other suitable computer processor.

Processor 705 is coupled, via a computer data bus (not shown), to volatile memory 720 and non-volatile memory 725. Non-volatile memory 725 stores computer programs (e.g., application programs, service programs, drivers, frameworks, etc.) consisting of computer-executable instructions, which may be loaded into volatile memory 720 for execution by processor 705 as needed. It will be understood by those skilled in the art that references herein to a computing device as carrying out a function or acting in a particular way imply that a processor (e.g., processor 705 of computing device 710) is executing instructions (e.g., a software program) stored in a memory and possibly transmitting or receiving inputs and outputs via one or more interface. Volatile memory 720 may also store data input to, or output from, processor 705 in the course of executing the computer-executable instructions.

Processor 705 is also coupled to one or more output device 750, which outputs information and data as directed by various computer programs executed by user device 700. For example, output device 750 may be a display, such as a light emitting diode (LED) array or liquid crystal display (LCD). In some cases, the output device 750 may be a printer, such as a laser, inkjet, dye sublimation or offset printer.

Processor 705 is coupled to a data communication interface 745. In at least some embodiments, the data communication interface 745 is a wireless cellular data network interface, such as GSM, EDGE, UMTS, LTE, 5G systems and the like. In some other embodiments, data communication interface 741 may be another wireless interface, such as Wi-Fi™. In some embodiments, data communication interface 741 may be a fixed data communication interface, such as an IEEE 802.3 interface (e.g., Ethernet).

In embodiments where data communication interface 745 is a wireless communication interface, it may be coupled to an antenna 747, which can be used to transmit and receive signals for wireless data communication.

In embodiments where user device 700 is a portable computing device, user device 700 may be powered by an energy storage unit 762, such as a battery or capacitor. The energy storage unit 762 may be managed (e.g., charged and discharged) under the control of a PMU 760. PMU 760 may also be coupled to processor 705, and other elements of user device 700, to regulate energy usage of those elements. For example, PMU 740 may direct processor 705 to operate at a reduced frequency, or to disable subcomponents, in order to reduce energy usage when the energy or charge level of energy storage unit 762 is low.

In some cases, user device 700 may be equipped with one or more sensors 770, such as an IMU, a proximity sensor, or other sensors.

In some embodiments, processor 705 may be coupled to a peripheral bus interface via a data bus. In other embodiments, a peripheral bus interface may be omitted and processor 705 may be coupled to other elements of user device 700 via a direct link.

Figure 8:
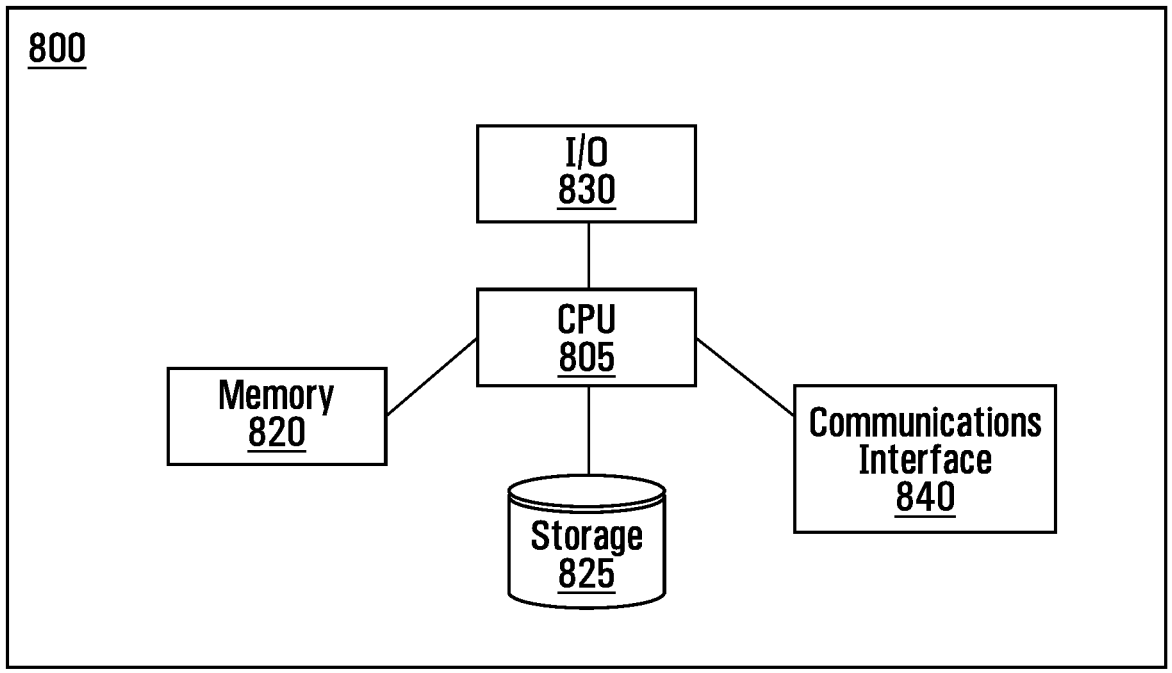
FIG. 8 is a simplified block diagram of a service provider device in accordance with some embodiments.

Referring now to FIG. 8, there is illustrated a simplified block diagram of service provider device 800. Service provider device 800 is one example implementation of the node devices 630, application server 620 or service provider devices 640 of FIG. 6.

Service provider device 800 has a processor 805, which is communicatively coupled to a volatile memory 820, a non-volatile memory 825, input and output devices 830, and a data communications interface 840.

In at least some embodiments, service provider device 800 is a computer server, which may be provided in a data center, or as part of a cloud computing environment.

In some embodiments, service provider device 800 may have a peripheral bus interface (not shown) which is used to communicatively couple the processor 805 with other elements of service provider device 800. It will be appreciated that FIG. 8 is a simplified diagram of but one example embodiment, and that various other arrangements and computer system architectures may be used. Description of other elements of the service provider device 800 are omitted to aid exposition.

Processor 805 is a computer processor, such as a general purpose microprocessor. In some other cases, processor 805 may be a field programmable gate array, application specific integrated circuit, microcontroller, or other suitable computer processor.

Processor 805 is coupled, via a computer data bus (not shown), to volatile memory 820 and non-volatile memory 825. Non-volatile memory 825 stores computer programs (e.g., application programs, service programs, drivers, frameworks, etc.) consisting of computer-executable instructions, which may be loaded into volatile memory 820 for execution by processor 805 as needed. It will be understood by those skilled in the art that references herein to a computing device as carrying out a function or acting in a particular way imply that a processor (e.g., processor 805 of computing device 810) is executing instructions (e.g., a software program) stored in a memory and possibly transmitting or receiving inputs and outputs via one or more interface. Volatile memory 820 may also store data input to, or output from, processor 805 in the course of executing the computer-executable instructions.

Processor 805 is coupled to a data communication interface 840. In at least some embodiments, the data communication interface 840 is as an IEEE 802.3 interface (e.g., Ethernet) or other data communication interface.

In some embodiments, processor 805 may be coupled to a peripheral bus interface via a data bus. In other embodiments, a peripheral bus interface may be omitted and processor 805 may be coupled to other elements of service provider device 800 via a direct link.

Referring now to FIG. 9, there is illustrated an example process flow diagram for a method of attributing media data items in an attribution ledger system in accordance with at least some embodiments. Method 900 may be carried out, for example, by a node server, such as node 630 of FIG. 6, or by an application server, such as application server 620.

Method 900 begins at 905, with the device receiving a media data item. The media data item can include both media data (e.g., audio data, video data, image data, text data, etc.) and metadata associated with the media data.

At 910, the device computes at least one metric as described herein, based on the media data item. Computing the at least one metric may involve processing the media data item—whether the media data itself or the metadata—using a machine learning system trained using a corpus of media data items. In some cases, computing the at least one metric may involve retrieving and comparing the metadata associated with the media data item with one or more external metadata sources.

In some cases, the machine learning system may determine, based on processing the media data item, that a related media data item is already stored in the attribution database.

At 915, the device generates and transmits an attribution request with the at least one metric to a plurality of nodes that form the distributed ledger of the master attribution ledger system. In some embodiments, the device also computes an attribution score based on the at least one metric and includes the attribution score with the attribution request.

At 920, each of the plurality of nodes re-computes the attribution score based on the at least one metric received in the attribution request, and transmits its recomputed attribution score back to the requesting device in an attribution response. In some embodiments, a subset of the nodes may perform the computation. In some embodiments, the re-computed attribution score may be transmitted to a subset of the nodes. In embodiments where the attribution request included an initial attribution score, the nodes may simply verify that the initial attribution score is computed correctly.

At 925, the device receives the plurality of attribution responses from the plurality of nodes and computes a consensus attribution score based on the initial attribution score computed by the device and the re-computed attribution scores received from the plurality nodes.

At 930, the device determines whether the consensus attribution score exceeds a predetermined attribution score threshold.

If the consensus attribution score exceeds a predetermined attribution score threshold, the device may attribute the media data item to one or more rightsholders in an attribution database at 940, and may transmit a notification of the attribution to the plurality of nodes to do likewise. The attribution database may be the local copy of the attribution ledger kept by each device or node. In some cases, the attribution database may be an external database. In some variant embodiments, each of the plurality of nodes may independently carry out the determination at 930 and the attribution at 940, without the exchange of notifications.

In some cases, attributing the media data item in the attribution database may involve fingerprinting the media data to generate a unique identifier associated with the media data, and storing the unique identifier in the attribution database. In cases where a related media data item already exists in the attribution database, attributing the media data item may involve storing a link between the media data item and the one or more related media data items in the attribution database. Attribution may also involve determining a timestamp, and storing the timestamp in the attribution database.

If the consensus attribution score does not exceed a predetermined attribution score threshold, then the device may initiate an exception handling process at 950 and, optionally, may transmit a non-attribution notification to the plurality of nodes. The exception handling process may proceed as described elsewhere herein.

For example, if the machine learning system or metadata comparison has identified that a related media data item already exists in the attribution database, this may cause the attribution score to fall below the predetermined score threshold in some cases. The device may then invoke an exception handling process in response. In some other cases, the related media data item may be linked to the media data item in the attribution database.

Referring now to FIG. 10, there is illustrated an example process flow diagram for a method of attributing media data items in an attribution ledger system in accordance with at least some embodiments. Method 1000 may be carried out, for example, by a node server, such as node 630 of FIG. 6, or by an application server, such as application server 620.

Method 1000 begins at 1005, with the receipt of a claim dispute request and the creation of a claim dispute record smart contract. The claim dispute request may identify one or more attribution claim that is disputed, for example, because of an erroneous attribution, because a valid attribution has failed to achieve a required consensus attribution score, etc.

At 1010, a preliminary assessment is carried out to determine whether the claim dispute request has merit. The preliminary assessment may be automated in some cases. For example, in some cases, the automated assessment may compute a merit score based on one or more factors, such as a reputation score of the party that submitted the claim dispute request, the consensus attribution score of the claim under dispute, the nature and degree of the alleged misattribution, and other factors. In some cases, the preliminary assessment may simply be a validation of the data in the claim dispute request, to validate that the necessary conditions for a claim dispute have been met. If the merit score meets or exceeds a predetermined threshold, the claim dispute may proceed at 1015. In some cases, the preliminary assessment may involve a manual component, and an administrative user may be requested to review and/or authorize the claim dispute request.

If the merit score does not meet the predetermined threshold, the claim dispute request may be rejected at 1030.

At 1015, the claim or claims that are the subject of the claim dispute request may be marked as "in dispute" and scheduled for re-assessment. While marked as "in dispute" any contracts that depend on the claims under dispute may be postponed, or delayed until such time that the claims are no longer marked "in dispute." Re-assessment may involve a re-execution of the original claim attribution procedure, as described elsewhere herein, but taking into account any new information in the master attribution ledger or the claim dispute request itself.

If the result of the re-assessment indicates that the claim or claims should be changed (at 1020), then the claim or claims may be updated in the master attribution ledger at 1025. Otherwise, the claim dispute request may be considered rejected at 1030.

The above description of illustrated embodiments, including what is described in the abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. A media attribution system, the system comprising:
   a distributed ledger system comprising a plurality of nodes;
   a computing device configured to:
      receive a media data item, the media data item comprising media data and metadata;
      compute at least one metric based on the media data item; and
      transmit an attribution request comprising the at least one metric to at least one of the plurality of nodes;
   each of the plurality of nodes independently configured to:
      compute a respective attribution score in response to the attribution request and based on the at least one metric, wherein the computing the respective attribution score comprises processing the media data item using a machine learning system trained using a corpus of media data items;
      generate a respective attribution response comprising the respective attribution score, each respective attribution score of the plurality of nodes collectively forming a plurality of attribution responses;
      based on the plurality of attribution responses, compute a consensus attribution score based on the plurality of respective attribution scores in the plurality of attribution responses; and
      when the consensus attribution score exceeds a predetermined attribution score threshold, attribute the media data item to one or more rightsholder account in an attribution database.

2. The media attribution system of claim 1, wherein the machine learning system processes the media data.

3. The media attribution system of claim 1, wherein the machine learning system processes the metadata.

4. The media attribution system of claim 1, wherein the plurality of nodes communicate via peer-to-peer networking.

5. The media attribution system of claim 1, wherein each of the plurality of nodes is further configured to determine a related media data based on the machine learning system processing the media data.

6. The media attribution system of claim 5, wherein each of the plurality of nodes is further configured to update the attribution database to store a link between the media data and the related media data.

7. The media attribution system of claim 5, wherein each of the plurality of nodes is further configured to invoke an exception handling process.

8. The media attribution system of claim 1, wherein the computing the respective attribution score comprises retrieving and comparing the metadata with external metadata sources.

9. The media attribution system of claim 8, further comprising a local copy of the attribution database stored at each of the plurality of nodes, wherein the computing device is further configured to transmit the attribution of the media data item to the rightsholder account to each of the plurality of nodes, when the consensus attribution score exceeds the predetermined attribution score threshold.

10. The media attribution system of claim 1, wherein attributing the media data item to the rightsholder account comprises fingerprinting the media data to generate a unique identifier associated with the media data, and storing the unique identifier in the attribution database.

11. The media attribution system of claim 1, wherein attributing the media data item to the one or more rightsholder account comprises determining one or more related media data items in the attribution database, and storing a link between the media data item and the one or more related media data items in the attribution database.

12. The media attribution system of claim 1, wherein attributing the media data item to the one or more rightsholder account comprises determining a timestamp, and storing the timestamp in the attribution database.

13. The media attribution system of claim 1, wherein the plurality of nodes generate one or more automated processes, each of the automated processes generating an output associated with the one or more rightsholder account.

14. The media attribution system of claim 13, wherein the plurality of nodes form a blockchain, and wherein the one or more automated processes are smart contracts.

15. The media attribution system of claim 13, wherein the one or more automated processes comprise a smart contract selected from the group consisting of: a right owner smart contract, a royalty smart contract, and a disputes smart contract.

16. The media attribution system of claim 1, wherein the at least one metric is computed based on the media data of the media data item.

17. The media attribution system of claim 1, wherein the at least one metric is computed based on the metadata of the media data item.

18. The media attribution system of claim 1, wherein the attribution request further comprises an indication of the one or more rightsholder account.

19. The media attribution system of claim 1, wherein each of the plurality of nodes is further configured to transmit a notification to each other of the plurality of nodes in response to computing the consensus attribution score.

20. The media attribution system of claim 19, wherein, when the consensus attribution score does not exceed the predetermined attribution score threshold, the notification is a non-attribution notification.

21. The media attribution system of claim 20, wherein each of the plurality of nodes is further configured to engage an exception handling process in response to the non-attribution notification.

22. The media attribution system of claim 21, wherein the exception handling process is a computational consensus mechanism involving the plurality of nodes.

23. The media attribution system of claim 1, wherein each of the plurality of attribution responses is immutably associated with the media data item in the blockchain based on the attribution request.

24. The media attribution system of claim 1, wherein the consensus attribution score is immutably associated with the media data item in the blockchain based on the plurality of attribution responses.

* * * * *